Dec. 22, 1953 — J. F. YOUNG — 2,663,160

EVAPORATOR

Filed Oct. 2, 1951

Inventor
James F. Young
by *Sheridan W. Reyis*
His Attorney

Patented Dec. 22, 1953

2,663,160

UNITED STATES PATENT OFFICE 2,663,160

EVAPORATOR

James F. Young, Erie, Pa., assignor to General Electric Company, a corporation of New York Application October 2, 1951, Serial No. 249,361

10 Claims. (Cl. 62—103)

My invention relates to evaporators and more particularly to evaporators for use in household refrigerators.

Food storage compartments of household refrigerators are frequently cooled by evaporators disposed within the food storage compartment and exposed to the air therein. In the conventional usage, the evaporator is disposed near the top of the food storage compartment so that natural circulation of air is secured. In order to avoid the necessity for manual defrosting or for providing automatic devices to effect defrosting, it may be desirable to operate the evaporator on a defrosting cycle; that is, to operate the evaporator within a range of temperatures such that, during the idle period of the refrigerating unit, the evaporator rises to a temperature sufficiently high to effect melting of all frost collected thereon during the operating period of the refrigerating unit. With the evaporator mounted at the top of the food storage compartment, it will be apparent that the water resulting from the melting of frost on the evaporator may fall downwardly onto the food stored in the compartment. Such dripping of moisture onto the food is, of course, undesirable. By my invention a preferential path for drainage of moisture to the rear of the compartment is provided, thereby minimizing the dripping of water onto the food stored in the lower portion of the compartment. In order to minimize collection of frost on the evaporator during the operating period, so as to facilitate complete melting of the frost during the idle period of the refrigerating unit, it is desirable that the evaporator operate at a temperature only slightly, say 8° F. to 10° F., below that of the air in the food storage compartment. If satisfactory cooling of the air is to be secured with an evaporator temperature differing only slightly therefrom, it is necessary that a high rate of heat transfer be secured between the evaporator and the air. The evaporator of my invention is so constructed to secure this rapid heat transfer. Since the evaporator is able to maintain satisfactory cooling of the storage compartment with a temperature differential of only 8° F. to 10° F., optimum humidity conditions in the compartment are achieved. In addition, my evaporator is of relatively low thermal mass to further facilitate complete defrosting during the off cycle.

Accordingly, it is an object of my invention to provide an improved evaporator for operating on a defrosting cycle.

It is another object of my invention to provide an improved evaporator having a high rate of heat transfer.

It is a further object of my invention to provide an improved evaporator for maintaining optimum humidity conditions in a food storage compartment.

It is still another object of my invention to provide an improved evaporator having a relatively low thermal mass.

It is another object of my invention to provide an improved evaporator having adequate provision for drainage of water therefrom and for minimizing drip therefrom.

It is another object of my invention to provide an improved evaporator which presents a pleasing appearance and is easily cleaned.

Further objects and advantages of my invention will become apparent as the following description proceeds and the features of novelty which characterize my invention will be pointed out with particularity in the claims annexed to and forming a part of my invention.

In carrying out the objects of my invention, the evaporator is formed from a continuous extruded section arranged in serpentine configuration. The extruded section includes a tubular refrigerant-conducting portion and a fin integral with the tubular portion and extending upwardly therefrom. The evaporator is disposed in the top portion of the food storage compartment with the parallel passes of the extruded section extending from the front to the rear of this compartment, and the evaporator is inclined downwardly to the rear to facilitate drainage of water therefrom. The fins may be scored to provide further preferential paths for the water.

For a better understanding of my invention reference may be had to the accompanying drawing in which Fig. 1 is an elevation view, partly broken away, of a portion of a refrigerator incorporating an embodiment of my invention.

Figure 1:
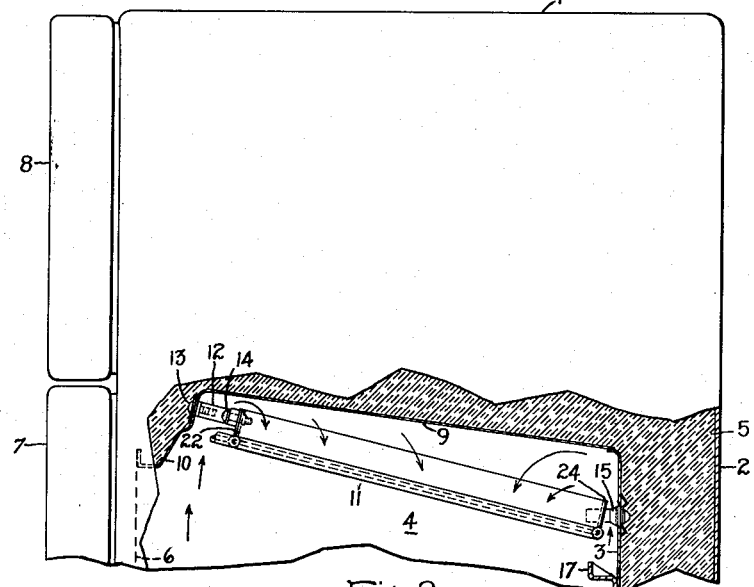

Referring now to the drawing, there is shown a refrigerator 1 including an outer metal wall 2. The refrigerator includes an inner wall or liner 3 spaced from the outer wall 2 and defining a food storage compartment 4. The space between the inner and outer walls is filled with a suitable thermal insulating material 5. The access opening 6 at the forward portion of the food storage compartment 4 is closed by a door 7. The particular refrigerator shown is a combination refrigerator which includes a freezer or frozen food compartment (not shown) closed by the door 8.

The lower compartment 4 is provided for the storage of fresh foods and the like.

Figure 3:
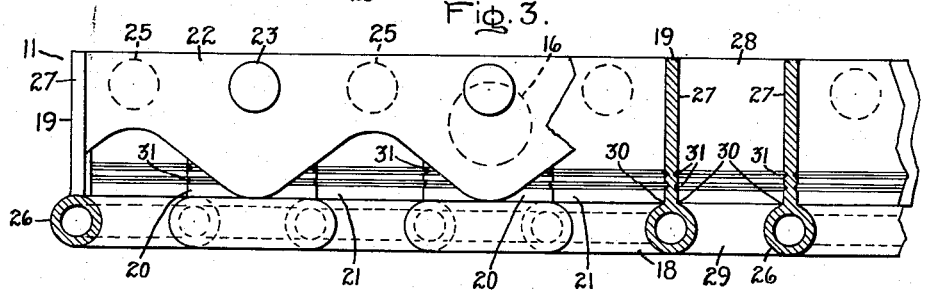
Fig. 3 is an enlarged elevation view, partly in section, of the refrigerator shown in Fig. 1.

The liner 3 includes a top wall 9 which is formed to slope downwardly from the front to the rear of the storage compartment 4 and which includes a depending portion or flange 10 at the forward end thereof. An evaporator 11 is provided for cooling the food storage compartment 4. The forward portion or end of the evaporator 11 is positioned behind the depending portion 10 of the top wall 9 so that this forward end of the evaporator is concealed from view during normal usage of the refrigerator. In order to support the forward end of the evaporator 11 supports or brackets, one of which is shown at 12, are secured to the depending portion 10 of the top wall 9 and extend rearwardly therefrom. Each of the brackets 12 is secured to the depending portion 10 by a screw 13 or other suitable fastening device, and the forward end of the evaporator 11 is secured to each of the brackets 12 by a screw 14 or other suitable fastening device. The rear portion or end of the evaporator 11 is supported by studs, one of which is shown at 15, which are mounted on the rear wall of the liner 3. The studs 15 extend through openings, one of which is shown at 16 in Fig. 3, provided in the evaporator structure.

In order to avoid the necessity of manual defrosting of the evaporator 11 or of providing automatic defrosting mechanisms, the evaporator 11 is operated within a range of temperatures extending above and below the freezing point of water. The higher temperature is chosen such that, in combination with the duration of the idle period of the refrigerating unit, all frost which has collected on the evaporator during the operating period of the refrigerating unit is melted during the idle period. It will be apparent that water will collect on the evaporator from the melting frost during the idle period of the refrigerating unit. Drippage of this water onto the food stored in the compartment 4 is undesirable. In accordance with my invention, the evaporator 11 is positioned within the compartment 4 so as to be inclined downwardly toward the rear wall of the liner 3. The amount of this inclination is chosen so as to cause the water collecting on the evaporator to follow a path along the evaporator to the rear of the food storage compartment and to minimize the dripping of this water downwardly from the evaporator onto the food stored below. With an evaporator of the type herein disclosed, it has been found that the evaporator should be inclined at an angle of at least 12 degrees with the horizontal. Of course, it will be apparent that, if space limitations permit, an additional factor of safety can be introduced by increasing the inclination of the evaporator to an angle greater than 12 degrees with the horizontal. However, an evaporator of the construction described in this application has been found to discharge water effectively to the rear while minimizing drippage onto the food stored below if an angle of inclination of 12 degrees is employed. Water is discharged from the rear end of the evaporator into a trough 17 mounted on the rear wall of the liner 3, and it is discharged from the ends of the trough onto the rear wall of the liner in a conventional manner. This discharge of defrost water along the rear wall assists in keeping the relative humidity in the compartment 4 at an optimum value.

Figure 2:
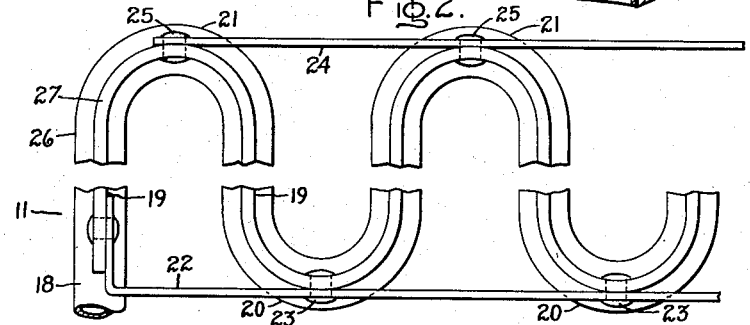
Fig. 2 is an enlarged plan view of a portion of the evaporator of Fig. 1.

In order to minimize the amount of frost collecting on the evaporator during the operating period of the refrigerating unit, it is desirable to operate the evaporator at a temperature as close as possible to that of the air in the food storage compartment; that is, to keep as low as possible the differential in temperature between the evaporator and the air in the compartment 4. This maintenance of small differential and the minimizing of the collection of frost also assists in maintaining a higher relative humidity in the compartment 4 than is possible with evaporators having a lower rate of heat transfer and hence operating at a lower temperature. In order to accomplish these objectives, it is necessary to have a high rate of heat transfer between the evaporator and the air. This is accomplished by a particular construction of the evaporator which facilitates heat transfer and which facilitates contact between the air and the evaporator. The details of construction of the evaporator are best shown in Figs. 2 and 3. The evaporator is formed from a continuous extruded section 18 preferably composed of a material of good thermal conductivity, such as aluminum. The continuous extruded section is formed into a serpentine configuration which includes a plurality of parallel straight portions 19 and a plurality of loop portions arranged in one plane. The loop portions connecting the ends of adjacent straight portions at the forward end of the evaporator are indicated at 20, and the loop portions connecting the ends of adjacent straight portions at the rear end of the evaporator are indicated at 21. In order to provide rigidity for the evaporator structure, to improve the appearance thereof, and to provide a mounting element, the evaporator includes the forward trim strip 22 which is secured to the forward loop portions 20 by rivets 23 or other suitable fastening devices, and a rear trim strip 24 which is secured to the rear loop portions 21 by rivets 25 or other suitable fastening devices. The particular configuration of the lower edges of the trim strip 22 is not my invention but is described and claimed in a copending application of Frank A Schumacher, Serial No. 249,367, filed October 2, 1951, and assigned to the assignee of the present invention.

The continuous extruded section 18 includes a lower tubular portion 26 for conducting refrigerant through the evaporator and an upwardly extending fin 27, the fin being in a plane extending vertically through the longitudinal axis of the tubular portion 26. The fin 27 provides a heat transfer surface for facilitating conduction of heat from the air in the storage compartment 4 to the refrigerant in the tubular portion 26 of the extruded section. The construction illustrated gives a large surface for heat transfer along with ample space for circulation of air over the surface of the extruded section.

The natural convection of air within the storage compartment 4 is indicated by the arrows in Fig. 1. It will be noted that the warm air rises upwardly predominantly at the forward portion of the compartment, to the top wall 9, then flows downwardly through the spaces between adjacent parallel passes of the evaporator, being cooled as it passes over the evaporator. The tubular portion 26 and the fin 27 are related so as to secure a maximum of contact between the air and the evaporator. As the air passes downwardly through the spaces between adjacent parallel passes of the extruded section 18, for example through the space 28 shown in Fig. 3, there is a tendency toward turbulence of the air. This turbulence tends to cause the air to move somewhat toward the center of the space 28, that is, away from the fin 27 to some extent. However, the particular arrangement of the extruded section with the relatively large tubular portion 26 at the bottom and the fin 27 extending upwardly therefrom insures a narrower space between the adjacent passes of the extruded section at the bottom thereof, for example, at the region 29 in Fig. 3, so that, even if the body of air should tend to move inwardly from the fin to some extent it will still be forced into contact with the cold tubular portion 26 before passing beyond the evaporator in its downward flow. Less effective heat transfer would be secured should the relationship of the tubular portion and the fin be reversed, that is, should the tubular portion 26 be placed at the top and the fin 27 extend downwardly therefrom. Under such circumstances, it will be appreciated that the downwardly flowing air would first pass through the most restricted space between the adjacent passes of the tubular portion 26 and would thereafter pass between the more widely spaced parallel passes of the fin 27. Under such circumstances a large portion of the air would tend to pass downwardly through the central portion of the space between adjacent parallel passes of the fin 27 and the amount of air actually flowing into intimate contact with the fin would be reduced over that so flowing in the arrangement shown in Figs. 2 and 3.

The particular arrangement of the parts of the extruded section 18 with the tubular portion 26 at the bottom and the fin 27 extending upwardly therefrom is also material to the proper drainage of water from the evaporator. The upwardly extending fin 27 provides a line of intersection 30 at its lower end with the tubular portion 26. Because of the greater ratio of water contact surface to the exterior surface of the water droplets, water from the melting frost on the fin 27 tends to collect along the line 30. Since the evaporator, as shown in Fig. 1, slopes downwardly to the rear of the compartment 4, water flowing along the fin 27 and into the lines of intersection 30 then tends to flow rearwardly along these lines 30 for disposition from the rear end of the evaporator. Accordingly, any tendency of the water resulting from the melting of frost on the fins to drip onto the food in the storage compartment 4 below the evaporator 11 is minimized. It will be seen that this advantage would not be present were the tubular portion 26 to be placed at the top and the fin 27 to depend therefrom, since then water from melting frost on the fin would flow downwardly to the lower edge of the fin and have a greater tendency to drip therefrom onto the food, particularly when the water collected in relatively large quantities. With the arrangement herein disclosed the only water tending to flow along the bottom surface of the evaporator, that is, along the bottom surface of the tubular portion 26, is that resulting from the melting of frost collected on the tubular portion 26 itself. This water flows downwardly to the bottom surface of the tubular portion 26 and it is only with regard to this portion of the total water involved that reliance must be had upon the slope of the evaporator alone for directing the water to the rear end of the evaporator. With respect to the water from the fin 27, the additional aid of the lines of intersection 30 is available. Since most of the water flows along the lines of intersection 30 where it is substantially concealed from the view of the user, this construction also improves the appearance of the evaporator from that standpoint.

To further facilitate drainage of water to the rear of the evaporator, one or more grooves 31 are provided in the fin 27 generally parallel to the lines of intersection 30 and spaced above these lines of intersection. As in the case of the lines of intersection 30, these grooves 31 provide a greater ratio of contact surface to the ratio of the exterior surface of the water on the fin and hence, the water has a tendency to collect in the grooves 31 and to flow downwardly along these inclined grooves to the rear end of the evaporator 11.

I have found it particularly advantageous to proper drainage of water from the evaporator to form the evaporator of aluminum and to treat the surface of the aluminum by a process known as anodizing. By this process, a dull aluminum oxide coating is provided on the surface, and this type of surface is effective in facilitating drainage of water. Since aluminum is a material which lends itself to extrusion, the evaporator is advantageously made from aluminum and the surface thereof anodized by a process well known in the art. I have also found that heavily etched surfaces impair the drainage qualities of evaporator constructions of the type disclosed above and that bright or shiny surfaces are undesirable for this purpose. For continued effective drainage during use, the surface of the evaporator should be kept clean. The extruded aluminum evaporator provides a structure of low thermal mass which facilitates the warming up of the evaporator during the off cycle and hence the complete defrosting thereof during this off cycle.

In addition to the other advantages pointed out above in describing the construction of the evaporator 11, it can be seen that the construction involved provides easy cleanability of the evaporator surfaces and that the evaporator structure, while providing a substantial space for air circulation and good heat transfer, provides a pleasing appearance to the user. Moreover, as pointed out above, the forward portion of the evaporator is hidden from normal view by the depending portion 10 of the top wall 9 so that the evaporator is visible only when the user's eyes are substantially as low as the level of the bottom edge of the depending portion 10. Even when fully exposed to view the evaporator presents a pleasing appearance somewhat similar to the appearance of the usual refrigerator shelves.

While I have shown and described a specific embodiment of my invention, I do not desire my invention to be limited to the particular construction shown and described and I intend, by the appended claims, to cover all modifications in the spirit and scope of my invention.

What I claim as new and desire to secure by Letters Patent of the United States is:

1. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including a tubular refrigerant-conducting portion and a fin extending upwardly from said tubular portion and extending longitudinally of said tubular portion, said evaporator being disposed with said straight portions extending parallel to the sides of said compartment and being inclined downwardly toward the rear of said compartment for facilitating drainage of water from said evaporator.

2. A refrigerator including a liner defining a food storage compartment, an evaporator mounted at the top of said compartment, said evaporator comprising an extruded section formed into serpentine configuration including a plurality of parallel straight portions arranged in a plane and a plurality of loop portions connecting the end of straight portions, said extruded section including a tubular refrigerant-conducting portion and a fin extending upwardly from said tubular portion and intersecting said tubular portion along a plane extending vertically through the longitudinal axis of said tubular portion, said evaporator being disposed with said straight portions extending parallel to the sides of said compartment and being inclined downwardly toward the rear of said compartment for facilitating drainage of water along the line of intersection between said fin and said tubular portion.

3. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including a tubular refrigerant-conducting portion and a fin extending upwardly from said tubular portion, said fin having at least one groove formed on each side thereof and extending generally parallel to the line of intersection between said fin and said tubular portion, said evaporator being disposed with said straight portions extending parallel to the sides of said compartment and being inclined downwardly toward the rear of said compartment for facilitating drainage of water along said line of intersection between said fin and said tubular portion and along said grooves.

4. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including an aluminum tubular refrigerant-conducting portion and an aluminum fin extending upwardly from said tubular portion and intersecting said tubular portion along the plane extending vertically through the longitudinal axis of said tubular portion, said evaporator being disposed with said straight portions extending parallel to the sides of said compartment and being inclined downwardly toward the rear of said compartment for facilitating drainage of water from said evaporator.

5. A refrigerator including a liner defining a food storage compartment, an evaporator mounted at the top of said compartment for cooling said compartment, said evaporator comprising an extruded section formed into serpentine configuration including a plurality of parallel straight portions aranged in a plane and a plurality of loop portions connecting the ends of said straight portions, said extruded section including an aluminum tubular refrigerant-conducting portion and an aluminum fin extending upwardly from said tubular portion and extending longitudinally of said tubular portion, said evaporator being disposed with said straight portions extending parallel to the sides of said compartment and being inclined downwardly toward the rear of said compartment for facilitating drainage of water from said evaporator, the surface of said extruded section being anodized to provide a dull aluminum oxide finish for facilitating drainage of water along said surface.

6. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including a tubular refrigerant-conducting portion and a fin extending upwardly from said tubular portion and intersecting said tubular portion along the plane extending vertically through the longitudinal axis of said tubular portion, said evaporator being disposed with said straight portions extending parallel to the sides of said compartment and being inclined downwardly toward the rear of said compartment at an angle of at least 12° with the horizontal for facilitating drainage of water from said evaporator.

7. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including a tubular refrigerant-conducting portion and a fin extending upwardly from said tubular portion, and intersecting said tubular portion along the plane extending vertically through the longitudinal axis of said tubular portion, said evaporator being disposed with said straight portions extending parallel to the sides of said compartment and being inclined downwardly toward the rear of said compartment for facilitating drainage of water from said evaporator, and at least one strip secured to said loop portions for mounting said evaporator and for providing rigidity.

8. A refrigerator including a liner defining a food storage compartment, said liner including a top wall having a depending portion at the forward end thereof, an evaporator disposed at the top of said compartment for cooling said compartment, said evaporator comprising an extruded section formed into serpentine configuration including a plurality of said straight portions arranged in a plane and a plurality of loop portions connecting the ends of said straight portions, said extruded section including a tubular refrigerant-conducting portion and a fin extending upwardly from said tubular portion and intersecting said tubular portion along the plane extending vertically through the longitudinal axis of said tubular portion, said evaporator being disposed with said straight portions extending parallel to the sides of said compartment and being inclined downwardly toward the rear of said compartment for facilitating drainage of water from said evaporator, the forward end of said evaporator being positioned behind said depending portion whereby said forward end is concealed from view by said depending portion.

9. A refrigerator including a liner defining a food storage compartment, said liner including a top wall having a depending portion at the forward end thereof, an evaporator disposed at the top of said compartment for cooling said compartment, said evaporator comprising an extruded section formed into serpentine configuration including a plurality of said straight portions arranged in a plane and a plurality of loop portions connecting the ends of said straight portions, said extruded section including a tubular refrigerant-conducting portion and a fin extending upwardly from said tubular portion and intersecting said tubular portion along the plane extending vertically through the longitudinal axis of said tubular portion, said evaporator being disposed with said straight portions extending parallel to the sides of said compartment and being inclined downwardly toward the rear of said compartment for facilitating drainage of water from said evaporator, and means for mounting the forward end of said evaporator on said depending portion of said top wall whereby said forward end of said evaporator is concealed from view by said depending portion.

10. A refrigerator including a liner defining a food storage compartment, an evaporator mounted at the top of said compartment for cooling said compartment, said evaporator comprising an extruded section formed into serpentine configuration including a plurality of parallel straight portions arranged in a plane and a plurality of loop portions connecting the ends of said straight portions, said extruded section including a tubular refrigerant-conducting portion and a fin extending upwardly from said tubular portion and extending longitudinally of said tubular portion, said evaporator being disposed with said straight portions extending parallel to the sides of said compartment and being inclined downwardly toward the rear of said compartment for facilitating drainage of water from said evaporator, said evaporator being of low thermal mass for facilitating defrosting thereof during the off cycle of the refrigerating apparatus.

JAMES F. YOUNG.

References Cited in the file of this patent
UNITED STATES PATENTS

| Number | Name | Date |
|---|---|---|
| 2,209,431 | Tull | July 30, 1940 |
| 2,345,453 | Brace | Mar. 28, 1944 |
| 2,347,957 | McCullough | May 2, 1944 |
| 2,427,200 | Dreier | Sept. 9, 1947 |
| 2,516,586 | Peltier | July 25, 1950 |